United States Patent [19]

Jorget et al.

[11] Patent Number: 5,238,400
[45] Date of Patent: Aug. 24, 1993

[54] APPARATUS FOR DISTRIBUTING PNEUMATICALLY CONVEYED SOLID PULVERULENT MATERIAL

[75] Inventors: Serge Jorget, Marcq-en-Baroeul; Philippe Niel, Lille; Francis Decuyper, Lomme, all of France

[73] Assignees: FCB, Montreuil; Ciments Francais S.A., Puteaux, both of France

[21] Appl. No.: 978,243

[22] Filed: Nov. 18, 1992

[30] Foreign Application Priority Data

Nov. 27, 1991 [FR] France .................. 91 14672

[51] Int. Cl.$^5$ ............................ F27D 3/18
[52] U.S. Cl. ................... 432/99; 110/243; 406/155
[58] Field of Search ............ 432/96, 97, 99; 110/243, 244; 414/162; 406/144, 153, 155, 194

[56] References Cited

U.S. PATENT DOCUMENTS

| | | | |
|---|---|---|---|
| 2,489,211 | 11/1949 | Witt | 432/96 X |
| 3,834,860 | 9/1974 | Fukuda et al. | 432/58 |
| 4,027,602 | 6/1977 | Mott | 110/243 X |
| 4,147,504 | 4/1979 | Akae et al. | 432/96 X |
| 4,808,043 | 2/1989 | Le Marrec et al. | 406/155 X |

FOREIGN PATENT DOCUMENTS 2659134  9/1991  France .

Primary Examiner—William E. Tapolcai
Attorney, Agent, or Firm—Collard & Roe

[57] ABSTRACT

An apparatus for distributing pneumatically conveyed solid pulverulent material over an annular area of large diameter comprises an enclosure defining an annular chamber having a substantially vertical axis, a closed upper end and a lower end, an upper portion adjacent the closed upper end and a lower portion adjacent the lower end. A section defined by a plane extending perpendicularly to the axis has a constant area in the upper portion and an area decreasing progressively towards the lower end in the lower portion. An annular outlet opening or a series of annularly arranged outlet openings is defined by the lower end, and an inlet conduit for a flow of gaseous fluid for pneumatically conveying the solid pulverulent material into the chamber is connected to the upper chamber portion so that the gaseous fluid flow penetrates the chamber in an approximately radial direction.

18 Claims, 1 Drawing Sheet

APPARATUS FOR DISTRIBUTING PNEUMATICALLY CONVEYED SOLID PULVERULENT MATERIAL

BACKGROUND OF THE INVENTION

1. Field of the Invention

The present invention relates to the art of treating raw materials with a gaseous fluid in a thermal treatment stage, which sometimes may involve a chemical reaction. Maximum efficiency in the thermal exchange and the chemical reaction is obtained when the solid raw material is in contact with the gaseous fluid in a finely divided or pulverulent state. Accordingly, this invention relates more particularly to an apparatus for distributing pneumatically conveyed solid pulverulent material over an annular area of large diameter, and specifically to a vertical furnace for calcining solid pulverulent material, the furnace comprising a ceiling, a combustion chamber adjacent the ceiling and such an apparatus mounted on the furnace ceiling.

2. Description of the Prior Art

The invention is applicable most particularly to the calcination or pre-calcination of raw materials for the manufacture of cement clinker. Generally, vertical furnaces are used for this purpose. These furnaces conventionally have a symmetry of revolution and are equipped with one or more burners and means for introducing solid materials into the furnace and to disperse them in the hot combustion gases produced by the burner or burners. It is difficult to obtain a proper dispersion of the solid materials in the gas, particularly if the furnace has a large diameter, for example in excess of two meters. The points of introduction of the materials into the furnace may be multiplied but the equal distribution of a flow of hot solid materials between several inlets poses problems which have not been solved satisfactorily. It has also been proposed to introduce the solid materials in suspension in a flow of a gaseous fluid entering the furnace tangentially but this has the disadvantage of causing centrifuging of the solids and this, in turn, brings with it a granulometric segregation of the materials by particle size. Consequently, the particles are subjected to differences in treatment, depending on their size.

Finally, it has also been proposed to introduce the solid material into the furnace in suspension in a gas current of annular cross section, which surrounds the flame of the burner and whose principal direction of flow runs parallel to that of the gas constituting the flame. In this manner, a moving curtain of material is formed around the flame of the burner and its heat radiation is effectively used for treating the material. The highest effectiveness is attained when the material is distributed densely and uniformly around the flame, and the material curtain has a small width. However, any irregularity in the distribution creates a discontinuity in the material curtain and risks causing local overheating.

SUMMARY OF THE INVENTION

It is the primary object of the present invention to provide an apparatus for distributing pneumatically conveyed solid pulverulent material uniformly over an annular area of large diameter. Such an apparatus is particularly useful for supplying such material to a calcination furnace.

The above and other objects are accomplished according to this invention with an apparatus which comprises an enclosure defining an annular chamber having a substantially vertical axis, a closed upper end and a lower end, an upper portion adjacent the closed upper end and a lower portion adjacent the lower end, a section defined by a plane extending perpendicularly to the axis having a constant area in the upper portion and an area decreasing progressively towards the lower end in the lower portion, and an annularly arranged outlet opening means defined by the lower end. Inlet conduit means for a flow of gaseous fluid for pneumatically conveying the solid pulverulent material into the chamber is connected to the upper chamber portion so that the gaseous fluid flow penetrates the chamber in an approximately radial direction. The outlet opening means may be an annular outlet or may be comprised of a series of outlet openings distributed regularly in a circle.

Blades may be arranged in the annular outlet and are so oriented as to impart a rotary motion about the axis to the flow of gaseous fluid. The outlet openings may be at the ends of short channels so oriented as to impart a rotary motion about the axis to the flow of gaseous fluid.

The ratio of the constant area of the upper region to the area of the outlet opening means and to the cross-sectional area of the inlet conduit means is preferably more than 3:1. The inlet conduit means may be a single inlet conduit or may comprise a plurality of inlet conduits having a total cross-sectional area which is more than three times that of the constant area of the upper region.

The upper chamber portion is defined by an interior and an exterior cylindrical enclosure wall which may have a common axis or two closely arranged parallel axes, in which case the distances between the parallel axes will not exceed 0.3 times the difference between the inner radii of the interior and exterior enclosure walls.

The enclosure walls have lower portions so oriented as to generate a gaseous fluid current of annular cross section which may be cylindrical or frusto-conical.

The enclosure of such an apparatus may be mounted on the ceiling of a vertical furnace for calcining solid pulverulent material, the furnace comprising a combustion chamber adjacent the ceiling.

BRIEF DESCRIPTION OF THE DRAWING

The above and other objects, advantages and features of this invention will become more apparent from the following detailed description of now preferred embodiments thereof, taken in conjunction with the accompanying somewhat schematic drawing wherein.

DETAILED DESCRIPTION OF PREFERRED EMBODIMENTS

Figure 1:
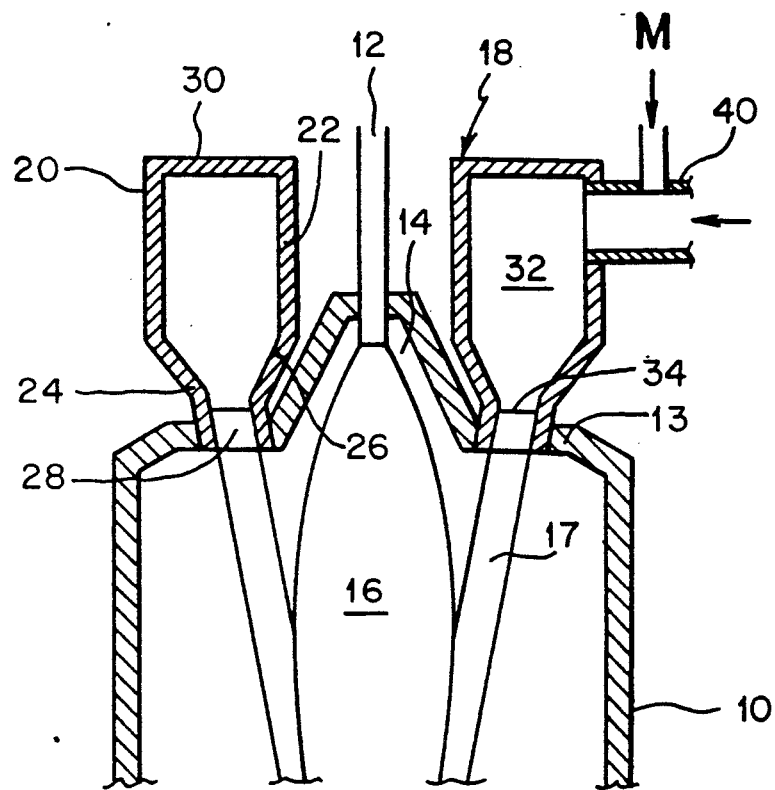
FIG. 1 is a vertical cross section of the top of a vertical precalcination furnace equipped with an apparatus for distributing pneumatically conveyed solid pulverulent material according to the invention, taken along a diametric plane.

Referring now to the drawing and first to FIG. 1, there is shown the upper part of vertical furnace 10 for calcining or precalcining solid pulverulent raw material in a cement clinker production plant. Such a furnace receives preheated raw materials in highly comminuted form of a flour-like consistency and feeds the precalcined material to a rotary tubular kiln in which the calcination is completed and where the material is converted into clinker. The furnace has a symmetry of revolution about a vertical axis and comprises ceiling 13 and combustion chamber 14 adjacent the ceiling and concentrically arranged in the center of the ceiling. The combustion chamber is heated by burner 12 and produces flame 16 which projects towards the bottom of the furnace.

Figure 2:
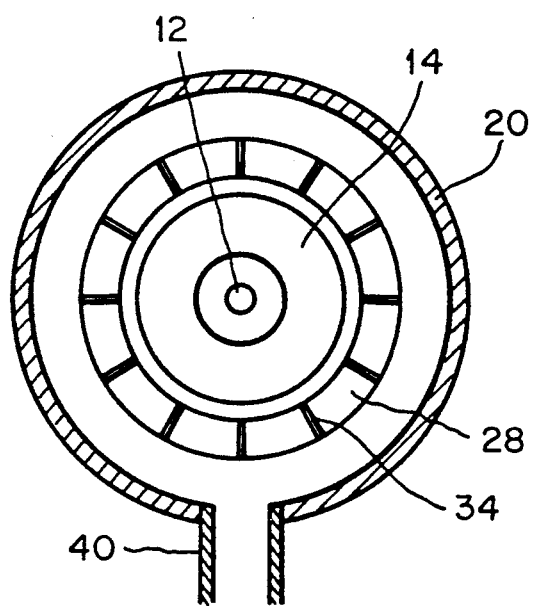
FIG. 2 is a horizontal cross section looking at the ceiling of the furnace from below, showing one embodiment of the annular outlet means of the distributor and its exterior enclosure wall.
Figure 3:
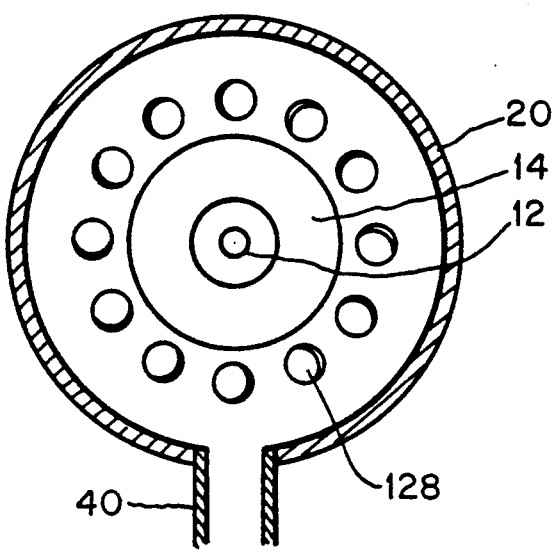
FIG. 3 is a like view showing another embodiment of the annularly arranged outlet means.

According to the invention, furnace 10 is equipped with apparatus 18 for distributing pneumatically conveyed solid pulverulent material M over an annular area of large diameter into the furnace. The apparatus comprises an enclosure mounted on ceiling 13 and defining annular chamber 32 having a substantially vertical axis coaxial with the furnace axis and being concentric with combustion chamber 14. The annular chamber has closed upper end 30 and a lower end, an upper portion adjacent the closed upper end 30 and a lower portion adjacent the lower end. As clearly shown in the drawing, a section defined by a plane extending perpendicularly to the axis has a constant area in the upper portion and an area decreasing progressively towards the lower end in the lower portion. An annularly arranged outlet opening means is defined by the lower end and leads into the furnace. In the embodiment illustrated in FIGS. 1 and 2, this outlet opening means is annular outlet opening 28. In the embodiment of FIG. 3, it is comprised of a series of outlet openings 128 distributed regularly in a circle. The illustrated inlet conduit means for a flow of gaseous fluid for pneumatically conveying the solid pulverulent material into annular chamber 32 is a single inlet conduit 40 connected to the upper chamber portion so that the gaseous fluid flow penetrates the annular chamber in an approximately radial direction.

The solid pulverulent raw material M coming from a preheater is fed into inlet conduit 40 where it is placed into suspension and conveyed into annular chamber 32 of apparatus 18 pneumatically by a flow of gaseous fluid circulating in inlet conduit 40. This gaseous fluid may be hot air recirculated from the cooler of the clinker or exhaust gases coming from the rotary kiln.

As shown in the drawing, a series of blades 34 are arranged in annular outlet 28 and the blades are so oriented as to impart a rotary motion about the axis to the flow of gaseous fluid. If a series of outlet openings 128 is used, the outlet openings may be at the ends of short channels so oriented as to impart a rotary motion about the axis to the flow of gaseous fluid.

The ratio of the constant area of the upper region to the area of the outlet opening means, i.e. annular outlet opening 28 or the sum of the areas of outlet openings 128, as well as to the cross-sectional area of inlet conduit 40 (or the sum of the cross-sectional areas of two or more inlet conduits, if such are used) is more than 3:1.

The upper chamber portion is defined by an interior cylindrical enclosure wall 22 and an exterior cylindrical enclosure wall 20, the enclosure walls being concentrically and coaxially arranged. The apparatus enclosure walls have lower converging portions 26 and 24 so oriented as to generate a gaseous fluid current of annular cross section and leading to the annular outlet means. In the illustrated embodiment, the annular cross section is frusto-conical. The conicities of converging lower enclosure wall portions 24 and 26 are selected so as to impart to the gaseous fluid flow the form desired to be produced in furnace 10. In the illustrated case, the conicities are chosen to produce a hollow conical flow current. At their lower ends, converging lower enclosure wall portions 24 and 26 are braced by blades 34 which improve the mechanical strength of the assembly and may be disposed vertically or slightly inclined to impart to the gaseous fluid flow leaving distributor 18 a low-speed rotary motion.

As shown in FIG. 3, the short channels leading to outlet openings 128 may be similarly oriented to create the same desired gaseous fluid flow. The total area of the outlet openings must be sufficient to enable the individual currents emerging from outlet openings 128 to form a single gaseous fluid flow of annular cross section, without discontinuities, at a very short distance from distributor 18. For this purpose, the short channels leading to outlet openings 128 may progressively flare outwardly from annular chamber 32 to furnace 10. This will produce annular curtain 17 of pneumatically conveyed solid pulverulent material M around flame 16 in furnace 10.

Instead of being absolutely vertical, the axis of annular chamber 32 of distributor 18 may be slightly inclined but the angle of inclination must not exceed 30°, such slight deviation from the vertical being encompassed by the term "substantially vertical".

Also, instead of being concentric with each other, cylindrical enclosure wall portions 20 and 22 may have parallel axes slightly spaced from each other. This spacing must not exceed 0.3 times the difference between the inner radii of the interior and exterior enclosure wall portions. The annularly arranged outlet opening means 28 or 128 may be coaxial with one of the parallel axes or it may be slightly radially offset with respect to both axes. The lower portion of annular chamber 32 would then be defined by frusto-conical enclosure wall portions 24, 26 whose axes form angles with the axes of enclosure wall portions 20, 22 whose value is a function of the spacing between the spacing of axes of the latter enclosure wall portions and the axis of the annularly arranged outlet opening means.

If more than one radially extending inlet conduit 40 is used, their axes, like the axis of single inlet conduit 40, would lie in the same plane as the axis of annular chamber 32 and these inlet conduits would be circumferentially spaced from each other around the chamber into which they lead. It may be noted, however, that a single conduit will advantageously be used to convey the preheated raw material to the inlet conduit means if a single source of the material is used.

The shape and dimensions of distributor 18 may be so chosen that the gaseous fluid flow in the upper portion of annular chamber 32 will have a low velocity. For example, for a gas flow velocity in inlet conduit 40 between 12 and 25 meters/second, the average velocity in the upper annular chamber portion will be less than 5 m/s. This low flow velocity, as well as the radial direction of the gas flow, avoids segregation of the solid pulverulent material according to size, due to general or local centrifugation phenomena.

Other advantages of the distributing apparatus include the ability to function properly with large charges of solid pulverulent material (more than 1 kg of material/kg of gaseous fluid) and the small sensitivity to variations in the feed rates or incidents (note that the inclinations of enclosure wall portions 24 and 26 exceed the angle of the slope of the treated material to avoid any deposits thereof on these enclosure wall portions;

the possibility of providing a single feed location at any point along the periphery;

the possibility of imparting a rotary motion to the flow at the outlet opening means of distributor 18, with a flow velocity chosen as a function of the specific operation; and the very simple construction and clean lines of the enclosure walls, which make it very easy to protect the walls by refractory linings if very hot materials are treated.

What is claimed is:

1. An apparatus for distributing pneumatically conveyed solid pulverulent material over an annular area of large diameter, which comprises
   (a) an enclosure defining an annular chamber having a substantially vertical axis, a closed upper end and a lower end, an upper portion adjacent the closed upper end and a lower portion adjacent the lower end, a section defined by a plane extending perpendicularly to the axis having
      (1) a constant area in the upper portion and
      (2) an area decreasing progressively towards the lower end in the lower portion, and
      (3) an annularly arranged outlet opening means defined by the lower end, and
   (b) inlet conduit means for a flow of gaseous fluid for pneumatically conveying the solid pulverulent material into the chamber, the inlet conduit being connected to the upper chamber portion so that the gaseous fluid flow penetrates the chamber in an approximately radial direction.

2. The apparatus of claim 1, wherein the outlet opening means is an annular outlet.

3. The apparatus of claim 2, further comprising blades arranged in the annular outlet and so oriented as to impart a rotary motion about the axis to the flow of gaseous fluid.

4. The apparatus of claim 1, wherein the outlet opening means is comprised of a series of outlet openings distributed regularly in a circle.

5. The apparatus of claim 1, wherein the outlet openings are at the ends of short channels so oriented as to impart a rotary motion about the axis to the flow of gaseous fluid.

6. The apparatus of claim 1, wherein the ratio of the constant area of the upper region to the area of the outlet opening means is more than 3:1.

7. The apparatus of claim 1, wherein the ratio of the constant area of the upper region to the cross-sectional area of the inlet conduit means is more than 3:1.

8. The apparatus of claim 7, wherein the inlet conduit means is a single inlet conduit.

9. The apparatus of claim 7, wherein the inlet conduit means comprises a plurality of inlet conduits and the ratio of the constant area of the upper region to the total cross-sectional area of the inlet conduits is more than 3:1.

10. The apparatus of claim 1, wherein the upper chamber portion is defined by an interior and an exterior cylindrical enclosure wall, the enclosure walls being coaxially arranged.

11. The apparatus of claim 10, wherein the enclosure walls have lower portions so oriented as to generate a gaseous fluid current of annular cross section.

12. The apparatus of claim 10, wherein the annular cross section is cylindrical.

13. The apparatus of claim 10, wherein the annular cross section is frusto-conical.

14. The apparatus of claim 1, wherein the upper chamber portion is defined by an interior and an exterior cylindrical enclosure wall, the enclosure walls having parallel axes slightly spaced from each other.

15. The apparatus of claim 14, wherein the enclosure walls have lower portions so oriented as to generate a gaseous fluid current of annular cross section.

16. The apparatus of claim 14, wherein the annular cross section is cylindrical.

17. The apparatus of claim 14, wherein the annular cross section is frusto-conical.

18. A vertical furnace for calcining solid pulverulent material, the furnace comprising a ceiling, a combustion chamber adjacent the ceiling and an apparatus for distributing pneumatically conveyed solid pulverulent material over an annular area of large diameter into the furnace, the apparatus comprising
   (a) an enclosure mounted on the ceiling and defining an annular chamber having a substantially vertical axis and being concentric with the combustion chamber, a closed upper end and a lower end, an upper portion adjacent the closed upper end and a lower portion adjacent the lower end, a section defined by a plane extending perpendicularly to the axis having
      (1) a constant area in the upper portion and
      (2) an area decreasing progressively towards the lower end in the lower portion, and
      (3) an annularly arranged outlet opening means defined by the lower end and leading into the furnace adjacent the combustion chamber, and
   (b) inlet conduit means for a flow of gaseous fluid for pneumatically conveying the solid pulverulent material into the annular chamber, the inlet conduit being connected to the upper chamber portion so that the gaseous fluid flow penetrates the annular chamber in an approximately radial direction.

* * * * *